United States Patent [19]

Erwin  BEST AVAILABLE COPY

[11] 3,997,132
[45] Dec. 14, 1976

[54] METHOD AND APPARATUS FOR CONTROLLING TIP VORTICES

[75] Inventor: John R. Erwin, Paradise Valley, Ariz.

[73] Assignee: The Garrett Corporation, Los Angeles, Calif.

[22] Filed: Dec. 11, 1974

[21] Appl. No.: 531,655

[52] U.S. Cl. .................................. 244/40 R; 244/55
[51] Int. Cl.² ........................................ B64C 23/06
[58] Field of Search ............. 244/40 R, 40 A, 130, 244/54, 55; 60/39.36

[56] References Cited

UNITED STATES PATENTS

| 2,477,461 | 7/1949 | Lee | 244/40 R |
| 2,934,889 | 5/1960 | Poulos | 244/40 R |
| 3,596,854 | 8/1971 | Haney | 244/40 A |
| 3,703,081 | 11/1972 | Krebs et al. | 60/39.36 |
| 3,735,946 | 5/1973 | Mullins | 244/54 |
| 3,841,587 | 10/1974 | Freed | 244/40 A |
| 3,881,669 | 5/1975 | Lessen | 244/130 |

Primary Examiner—Trygve M. Blix
Assistant Examiner—Barry L. Kelmachter
Attorney, Agent, or Firm—James W. McFarland; Albert J. Miller

[57] ABSTRACT

A jet engine disposed at and preferably in front of the tip end of an airplane wing with exhaust flow intercepting and rotating counter to tip vortex flow to reduce vortex induced drag, the angle of rotation of exhaust flow being cyclically variable to dissipate the vortex flow. The tip engine assists in powering the aircraft.

32 Claims, 9 Drawing Figures

METHOD AND APPARATUS FOR CONTROLLING TIP VORTICES

This invention relates to method and apparatus for controlling and reducing tip-vortices at the wind tips or other elements of an airfoil vehicle such as an aircraft relatively movable in a fluid medium, and for reducing the drag induced by such vortices.

An airfoil, such as an aircraft wing of finite length, has a tip end presenting a path for fluid from the higher pressure region on the bottom surface of the wind to flow toward the lower pressure region on the top surface in a relatively stable, vortex flow. Such vortex flow reduces lift while increasing drag on the aircraft thereby reducing the flight efficiency. Further, the wing and wind tip flows establish a pair of trailing vortices which remain in the air for extended periods of time posing serious hazards for following aircraft or aircraft crossing the region of such vortices. Typically, a time spacing of three minutes or more is provided between take-offs and landings of aircraft that may enter or cross the vortices of preceding aircraft to permit dissipation of the vortices, thereby contributing to delays in airport operations. Further, substantial loading and rotor noise are generated as the blade or the wing of rotary-wing aircraft passes through the vortices created by the preceding blade. As used herein, the term "wing" refers to a structural element of a vehicle moving relatively in a fluid medium.

Prior attempts to reduce tip vortices and their associated drag on airfoils have included directing a fluid jet in opposition to the vortex, attempting to re-route the vortex flow in opposition to itself and restyling the wing tip to increase the length of the path of the vortex flow to reduce its velocity, and providing an axial fluid intercepting the vortex flow behind the wing. None of these previous attempts have been found of particularly great efficiency in reducing the vortex or the induced drag, as they cannot produce a sufficiently powerful flow to counteract the vortex flow in a practical and economical structure. Further such arrangements require substantial redesign of an aircraft wing, rendering their incorporation into existing aircraft economically unfeasible in many instances. Also, none of the prior attempts take full advantage of the natural instability of the vortex pattern in inducing its breakup.

It is a primary object of the present invention to provide an improved method and apparatus for reducing or controlling such tip vortices.

More particularly, it is an object of the present invention to provide a jet engine at the tip end of an aircraft wing for producing forward thrust for the aircraft wherein the engine is arranged with an exhaust opening disposed completely forwardly of the wing tip such that the exhaust flow intercepts vortex flow around the wing tip to materially reduce vortex induced drag.

Another object of the invention is to provide a jet engine in the end region of wing wherein exhaust flow from the engine rotates in opposition to vortex flow to reduce the vortex flow and associated drag.

Yet another object of the invention is to provide such a tip jet engine with rotary exhaust flow wherein the direction of the rotary exhaust is cyclically varied to enhance the natural instability of the vortex flow to dissipate the latter.

A further object of the invention is to provide a fluid jet rotating counter to a vortex flow created by a structural element of a vehicle moving in a fluid medium, wherein the direction of rotation of the jet is cyclically varied to enhance the natural instability of the vortex flow to induce its breakup.

Another object of the invention is to provide an aircraft having a set of engines producing the majority of thrust for the aircraft, and a power thrust engine disposed at each wing tip whereby rotating exhaust flow from the tip engines intercepts and reduces vortex flow around the wing tip to increase aircraft operating efficiency, the tip engines also generating thrust for powering the aircraft.

A more particular object is to provide aircraft in accordance with the preceding object wherein the direction of the rotating exhaust flow may be cyclically varied during takeoff and landing operations to substantially completely breakup the tip vortices for increased safety of following aircraft.

A further object of the invention is to provide a tip jet engine having a U-shaped opening minimizing impact of exhaust flow upon the surfaces of the wing.

Another object of the invention is to provide a method for reducing vortex-induced drag on aircraft by providing a jet engine at the tip of the wing, and exhausting at least a portion of fluid flow from the engine completely forwardly of the tip to intercept the vortex flow.

Yet another object of the invention is to provide a method for reducing vortex-induced drag on an aircraft by providing a jet engine at the tip of the wing whose exhaust intercepts vortex flow around the wing tip, and rotating the exhaust flow in opposition to the vortex flow.

These and other objects and advantages of the present invention are specifically set forth or will become apparent from the following detailed description of preferred forms of the invention when read in conjunction with the accompanying drawings, wherein.

Figure 1:
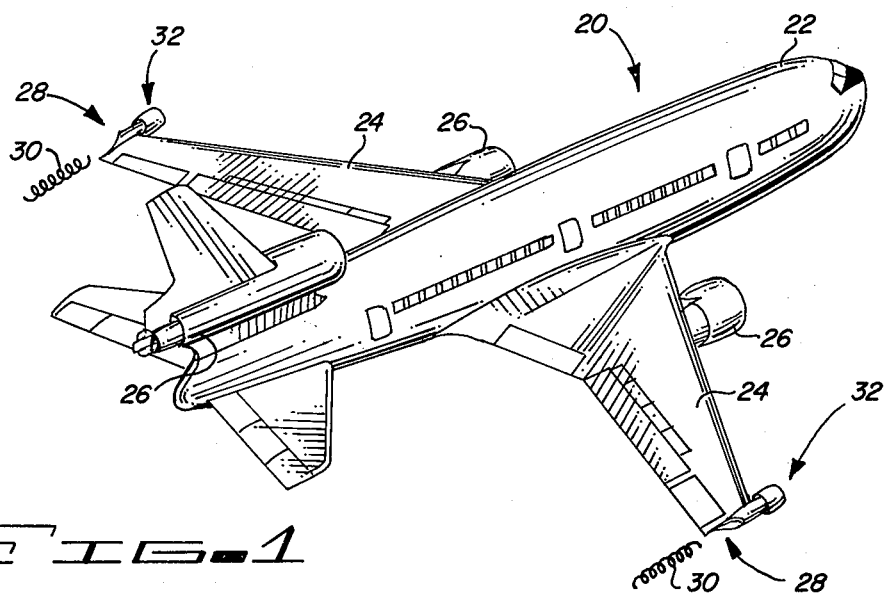
FIG. 1 is a perspective view of an aircraft embodying the present invention.
Figure 2:
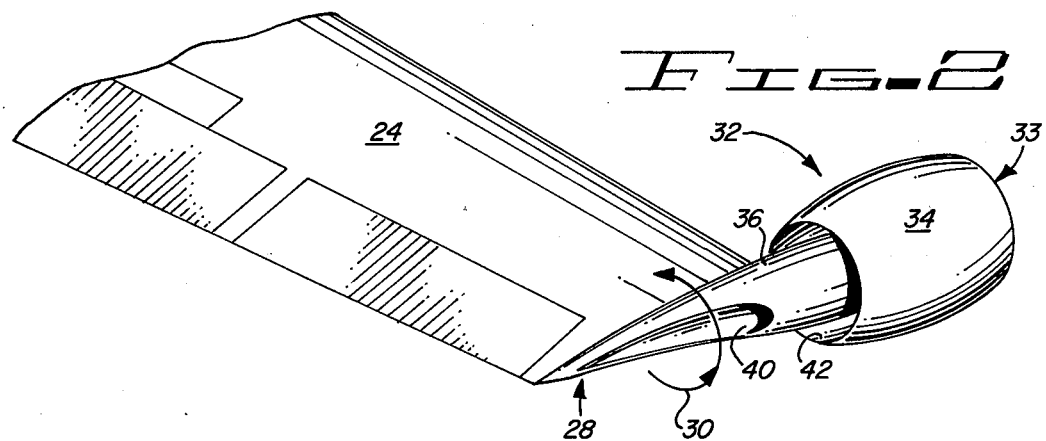
FIG. 2 is an enlarged perspective view of the wing tip and tip jet engine of the aircraft of FIG. 1.

Referring now to the drawings and more particularly to FIG. 1-5, there is illustrated a vehicle movable in a fluid medium, in the form of an aircraft generally designated by the numeral 20, which includes a fuselage 22 and swept lift wings 24 of finite length disposed on opposite sides of the fuselage. First engine means including one or more primary jet engines 26 on the aircraft, produce the majority of thrust for driving the aircraft forwardly.

Outer tip ends 28 of the aircraft wings present a path for air at higher pressure in the region adjacent the lower surface of wings 24 to flow or roll over tip ends 28 toward a region of lower pressure near the upper surface of the wings. Such fluid flow about the left and right wing tip end tends to establish tip vortex flows 30 respectively rotating clockwise and counterclockwise when viewed from the rear of the aircraft and depicted schematically by spiral lines in FIG. 1 and arrows in FIG. 2. The tip vortices trail behind the aircraft as it moves forwardly in the air creating dangerous air disturbances which may remain for extended time periods; however the vortices are relatively unstable and normally breakup or dissipate to fairly safe levels within a few minutes. The vortex flow also reduces lift and increases drag on the aircraft wings and reduces the overall flight efficiency.

A power thrust engine, in the form of a turbofan jet engine 32 is disposed adjacent each tip end 28. Each engine 32 defines an elongated housing that includes an outer cowling 34 and inner casing 36 suitably supported within cowling 34. Casing 36 presents a cylindrical member that extends lengthwise along tip end 28 and is secured thereto by suitable means not shown. Housing 33 has a circular air inlet duct 38 at its forward end and an exhaust duct at its opposite end which is divided by casing 36 into a central, cylindrical exhaust opening 40 and an annular exhaust opening 42 surrounding casing 36 and communicating with the inlet duct 38 via an axially extending, generally annular bypass duct 44. Guide vanes 45 may be included within duct 44 to direct air to flow most efficiently in an axial direction through duct 44.

Each engine 32 is of the two spool turbofan type having power means carried within casing 36, and includes high pressure and low pressure coaxial spools (shown schematically together at 46) and a front fan 48 driven by gearbox 50 connected with the low pressure spool. Also driven by the low pressure spool is an axial compressor having four rows of axial blades generally designated at 52. A low pressure turbine having three sets of axial blades 54 drives compressor 52 and fan 48. A single row, high pressure turbine 58 drives a centrifugal compressor 60 through the high pressure spool. As well known to the art, air received generally axially through inlet duct 38 is divided behind the fan with one portion of inlet air passing axially through bypass duct 44 while the remainder passes through an annular inlet opening 62 defined by casing 36 and into duct 64 within the casing. This portion of the inlet air flow is sequentially compressed by axial compressor 52 and centrifugal compressor 60 before entering an annular combustion chamber 56. Mixed with fuel delivered by one or more injectors 66, the air is heated within chamber 56 to a higher energy state and then sequentially expands across turbines 54 and 58 before exhausting through cylindrical exhaust opening 40 in a core exhaust flow depicted by dashed lines 68.

In accordance with the present invention, tip engine 32 is mounted to wing 24 with annular exhaust opening 42 located in general alignment with and completely forwardly of the leading edge of wing tip 28, preferably a distance approximately equal to the maximum diameter of opening 42. Exhaust flow from annular opening 44 thus intercepts and tends to reduce the strength of vortex flow 30 to materially reduce drag induced thereby. Core exhaust flow 68 combines with the portion of casing 36 extending rearwardly adjacent tip end 28 to present a generally cylindrical obstruction to the vortex flow, inducing the latter to flow in a longer path of larger arc that reduces the velocity and strength of the vortex flow.

Figure 3:
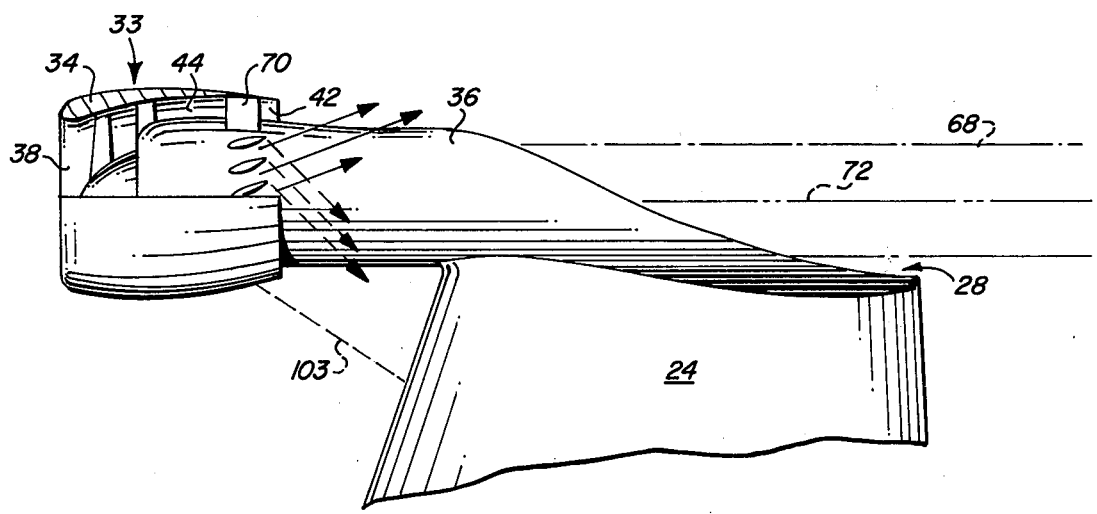
FIG. 3 is a top plan view of the wing tip and engine of FIG. 2 with portions of the engine broken away to reveal details of construction.
Figure 4:
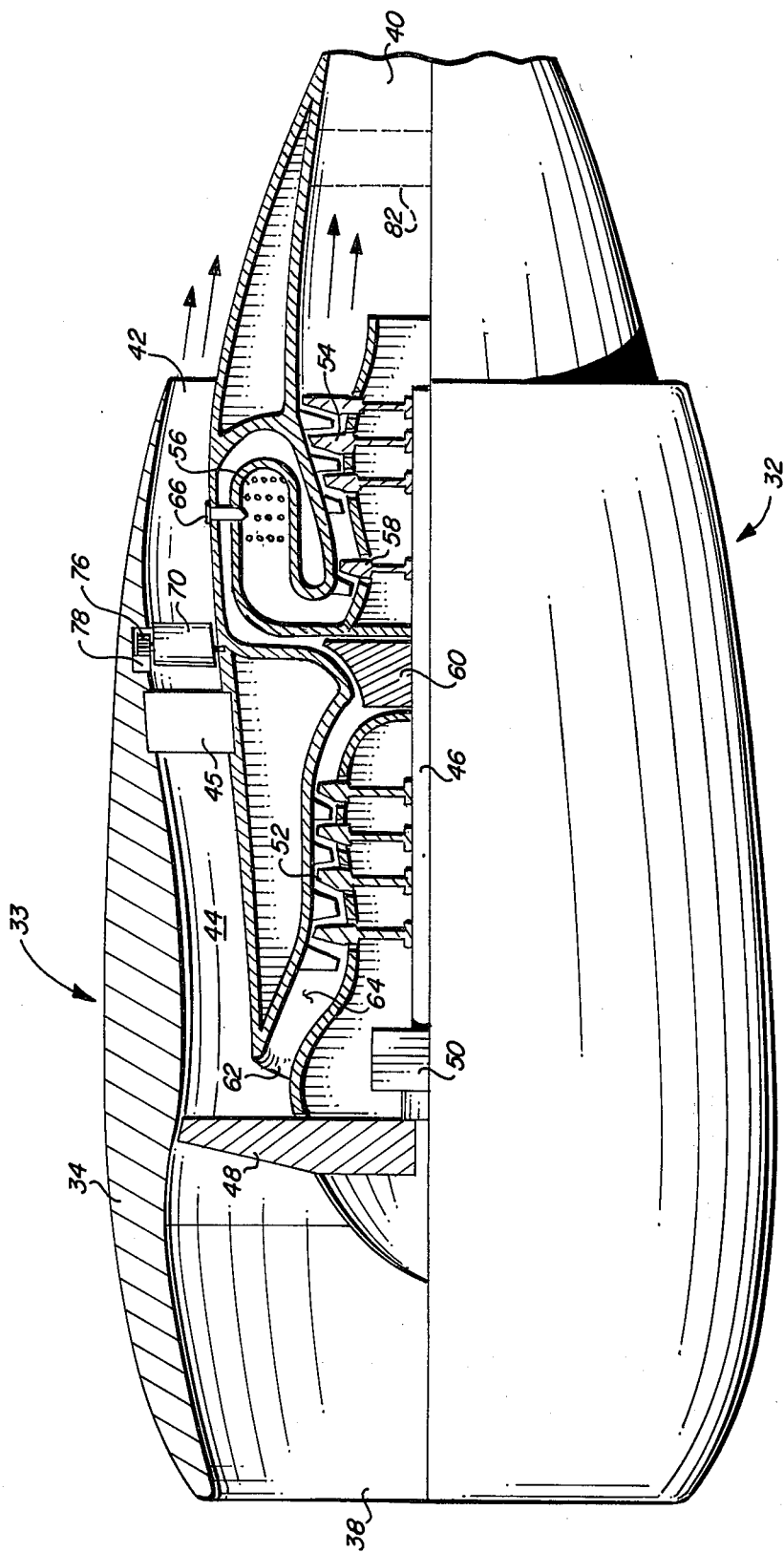
FIG. 4 is a partially cross-sectional, partially schematic, side elevational view of the engine of FIG. 3.
Figure 5:
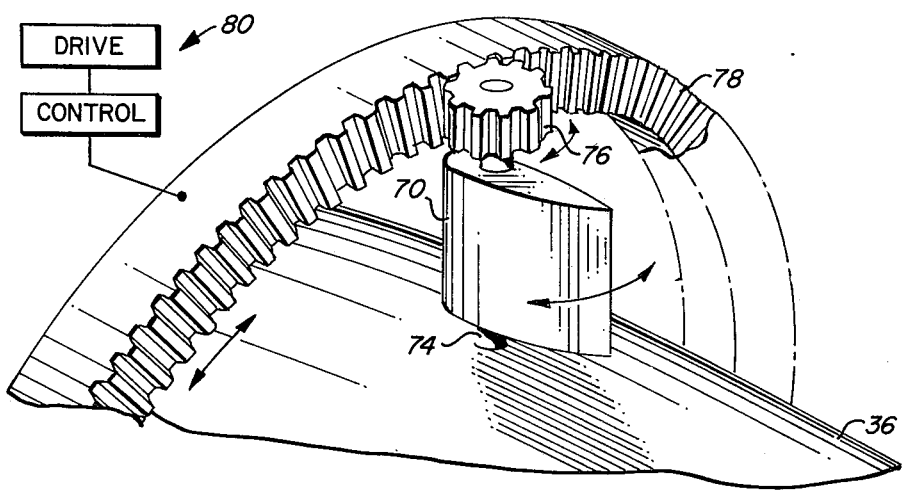
FIG. 5 is a partial perspective view of the movable exhaust guide vanes and a schematic representation of the drive therefor.

To further reduce the drag inducing vortex flow, engine 32 includes means for directing exhaust flow from annular exhaust opening 42 to rotate in a vortex pattern in opposition to vortex flow 30. The means illustrated comprise a plurality of guide vanes 70 in the exhaust extending radially across annular exhaust opening 42 normal thereto. Vanes 70 are equally spaced around annular opening 42. As shown in FIG. 3, vanes 70 are inclined in a circumferential direction relative to annular opening 42 such that exhaust flow through opening 42 rotates in a spiral as it exhausts rearwardly. The spiral angle of this vortex pattern of the exhaust is determined by the degree of inclination of the guide vanes 70. As shown by solid arrows in FIG. 3 the exhaust flow at the top of opening 42 flows generally outwardly relative to the wing tip end, while exhaust at the bottom flows generally inwardly as illustrated by the dashed arrows. (As used herein the term "spiral angle" refers to the angle between the tangent of any point on the vortex pattern and a line passing through that point parallel to longitudinal axis 72.) Similarly, all exhaust flow from full annular ring opening 42 is directed in counter-rotation to vortex flow 30.

It has been found that such exhaust flow rotating counter to the vortex flow at a spiral angle of approximately 18 degrees and exhausting from an opening located approximately one diameter forward of the wing tip, will slightly increase lift and reduce drag sufficiently to increase the overall efficiency of the wing by approximately twelve to sixteen percent, taking into account the minimal drag increase created by the inclined guide vanes 70 in a tip jet engine producing approximately ten percent or less of the forward thrust for the aircraft. It is believed that maximum performance may be obtained with the vanes inclined approximately thirty degrees and opening 42 located at least one diameter forward of the wing tip.

Vanes 70 are pivotally mounted to cowling 34 and casing 36 on suitable trunnion 74. As may best be seen in FIG. 5, each vane has a pinion gear 76 meshing with a ring gear 78 extending around cowling 34. Appropriate drive and control means 80 are included to rotate ring gear 78 and thereby pivot the vanes in unison to vary their degree of inclination. Accordingly, the vanes may be pivoted to inclination producing highest aircraft efficiency during in-flight cruise when the danger of trailing vortices is minimal, and to inclination substantially totally dissipating or breaking up the vortex flow during take-off and landing operations when the danger presented by tip vortices is a maximum. For simplicity of pilot operation, the drive means 80 may be associated with other mechanism, such as the landing flap actuator, or may be automated by inclusion in the control of a sensor sensing wing lift coefficient and actuating the wing gear to counteract tip vorticity in the manner desired. The means illustrated for varying vane inclination may be replaced by any other well known means for actuating movable guide vanes.

It has been found that wing tip vorticity may decay much more rapidly by augmenting its natural instability. To this end, guide vanes 70 are pivoted cyclically by the drive and control means 80 to periodically vary the spiral angle and generate exhaust vortex flow pattern of variable circulation. Cycling the vanes through relatively large angles, from approximately 60° clockwise to 60° counterclockwise relative to longitudinal axis 72, at a rate of one cycle in one to five seconds tends to induce substantial breakup of the wing tip vortex during take-off or landing.

The resulting rotary exhaust flow from annular opening 42, swirling about the generally axial core flow 68, generates a powerful, time varying exhaust flow capable of substantially dissipating the wing tip vortices and/or materially reducing the vortex drag to provide a substantial increase in aircraft operating efficiency. If desired, yet stronger rotational exhaust flow may be created by inclusion of guide vanes 82 (shown in dashed lines in FIG. 4) for directing core exhaust flow 68 to rotate in a vortex pattern opposing the tip vortex flow. Guide vanes 82 may be pivotally operated similar to vanes 70 if required.

Figure 6:
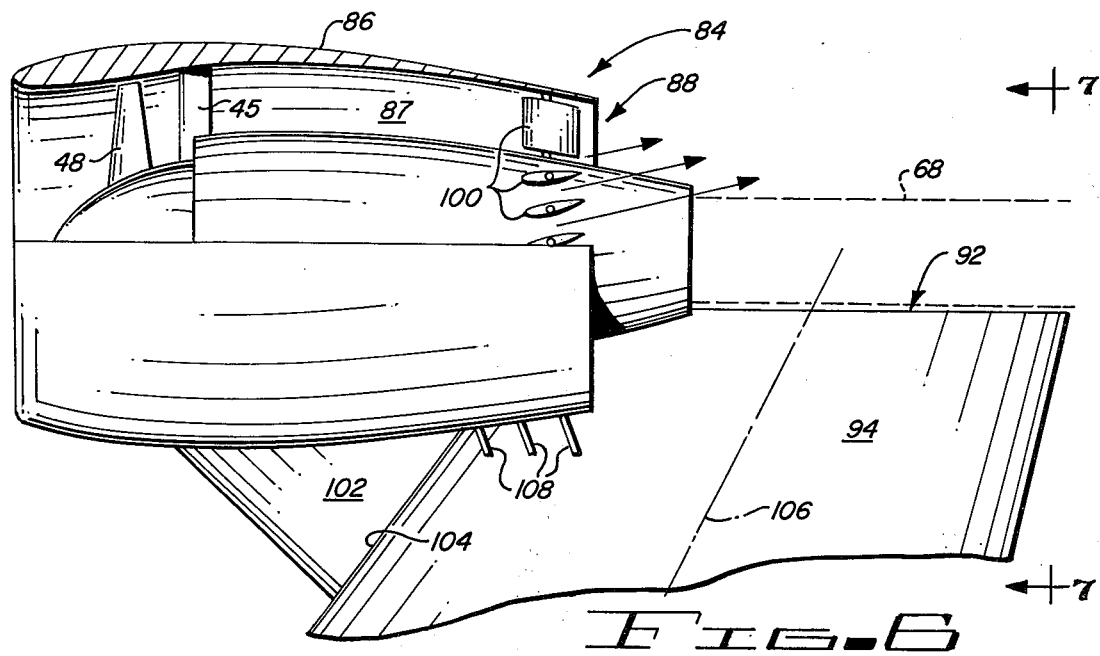
FIG. 6 is a partially cross-sectional, side elevational view of another form of the invention.
Figure 7:
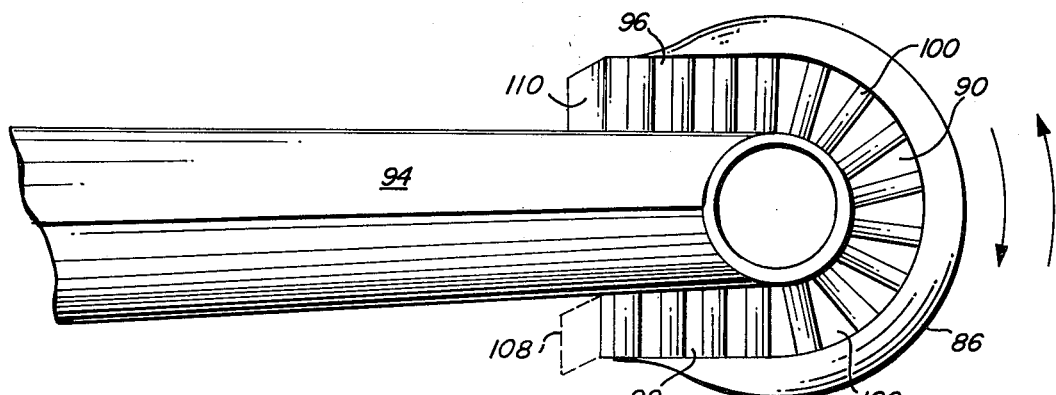
FIG. 7 is a rear elevation as viewed generally along lines 7—7 of FIG. 6.

FIGS. 6 and 7 illustrate a tip engine 84 having a modified outer cowling 86 which carries an inner casing 36 and power means identical to that described previously. Cowling 86 defines an axial bypass flow duct 87 ending in a generally U-shaped exhaust opening 88 that is comprised of an annular section 90 extending approximately 180° around the tip end 92 of a swept wing 94, and upper and lower sections 96, 98 of generally rectangular cross-sectional configuration. Sections 96 and 98 are respectively arranged to extend generally parallel to the adjacent upper and lower surfaces of wing 94 in a spanwise direction. Around the entire exhaust opening 88 are exhaust guide vanes 100 which function similarly to previously described guide vanes 70, the vanes in annular section 90 extending radially thereacross normal to the wing tip, while the vanes in sections 96 and 98 are substantially normal to the wing upper and lower surfaces.

Engine 84 is mounted to wing 94 by a streamlined support or pylon 102 having a rearward end suitably attached to the wing leading edge 104. The pylon extends forwardly of the wing with a forward end secured to cowling 86. In the embodiment illustrated, the engine is secured to the wing much more closely to wing neutral axis 106 to minimize the tendency of the wing tip to twist about axis 106 under the weight of engine 84. If desired, a pylon support 103 may be utilized in the previous embodiment as shown in FIG. 3.

The inward, rear portions of cowling 86 overlying the upper and lower wing surfaces smoothly taper to generally vertical sides. These portions of the cowling pivotally carry one or more vertical exhaust doors 108 and 110 that selectively restrict exhaust flow through associated side openings communicating with bypass duct 87.

In operation, all vanes 100 are simultaneously cyclically varied in inclination by any suitable drive means to create a time varying rotary exhaust flow in substantially the same manner described with respect to FIGS. 1–5. Exhaust flow from upper and lower sections 96 and 98, however, passes smoothly over the upper and lower wing surfaces in a manner substantially eliminating impact of exhaust flow upon the wing surfaces, minimizing any energy loss that would otherwise result from intersection of the exhaust flow with the wing. The engine exhaust flow is thus more compatible with the general air flow over the wing and is very similar, but opposite to the flow around the wing tip end.

Upon rotating vanes 100 to relatively large angles, e.g., 30°, or more, increased exhaust exit area is required to prevent stalling of fan 48 by back pressuree created by the vanes. To this end doors 108 and 110 may be opened to provide the increased exit area. The lower doors 110 are opened to increase exit area upon pivoting of vanes counterclockwise as shown in FIG. 7 in counter-flow to the tip vortex, and the upper doors 108 may be opened (as shown in phantom lines in FIG. 7) when the vanes are pivoted clockwise to produce exhaust flow rotating the same direction as the vortex flow.

Figure 8:
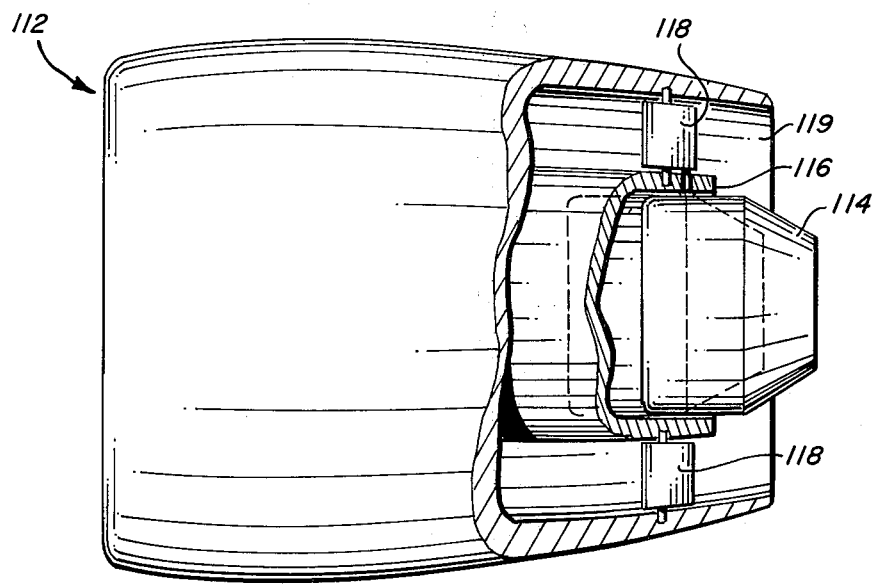
FIG. 8 is a side elevational view of yet another form of the invention with portions broken away to reveal details of construction.
Figure 9:
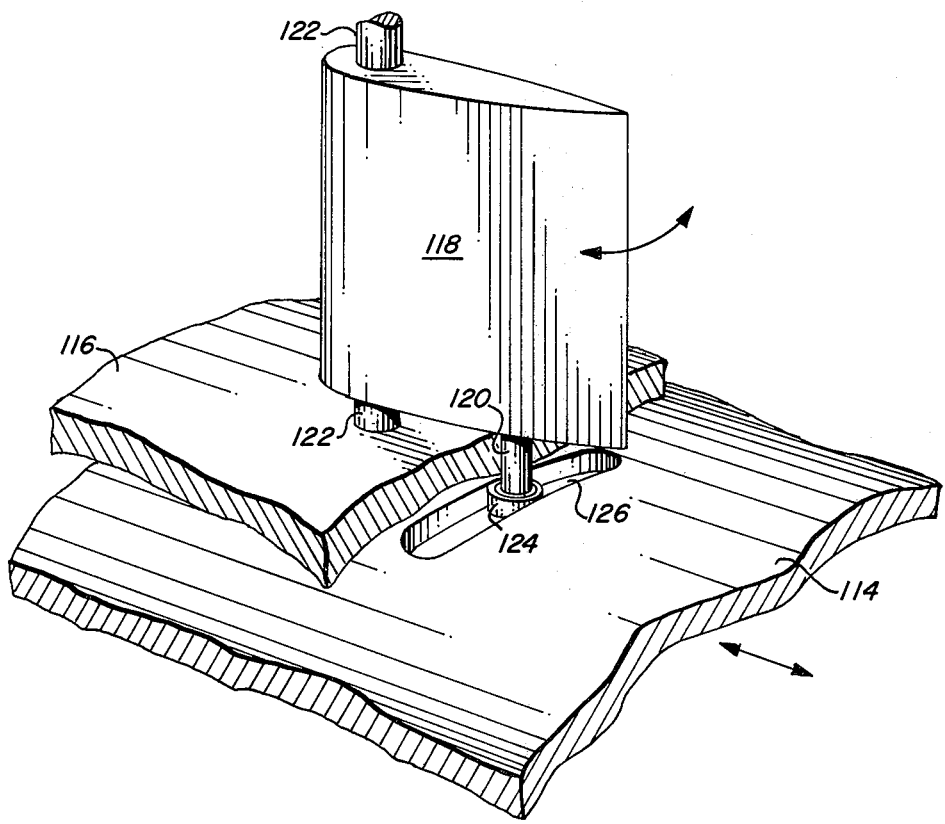
FIG. 9 is a partial perspective view of the axial drive means of the movable nozzle of FIG. 8.

A modified apparatus for producing a variable exit area is illustrated in FIGS. 8 and 9. In place of the doors 108 and 110 of FIG. 6, the tip jet engine 112 illustrated in FIG. 8 has an exhaust nozzle 114 that is axially movable relative to stationary inner casing 116 about which vane 118 pivots. Pin 120 extends freely through an appropriate opening in casing 116 to allow pivoting of the vane, and has a roller 124 fitting within a slot 126 in nozzle 114.

The exhaust nozzle presents a restriction to exhaust flow through annular opening 119 downstream of vanes 118. As vanes 118 pivots about trunnion 122, roller 124 moves along slot 126 to cause nozzle 114 to shift axially and vary the exhaust exit area. Nozzle 114 moves forwardly and increases exit area when vane 118 shifts either clockwise or counterclockwise from the position shown presenting maximum flow restriction.

It will thus be apparent that both the doors 108 and 110 of FIG. 6 and the movable nozzle 114 of FIG. 9 present means for variably restricting exhaust flow in a manner maintaining a substantially constant restriction to engine exhaust flow regardless of the inclination of the guide vanes. While doors 108 and 110 are located parallel to the guide vanes relative to the engine exhaust flow, the restriction presented by movable nozzle 114 is disposed downstream of the guide vanes in series relationship thereto relative to the exhaust flow.

In all of the foregoing embodiments, the tip jet engine presents a fluid jet exhaust from a housing disposed such that the fluid jet intercepts a vortex from a vortex-producing element of a vehicle moving in a fluid medium. Preferably, the fluid jet rotates in opposition to the vortex, and at least a portion of the jet exhausts completely forwardly of the vortexproducing element. The cyclically rotating exhaust feature, and/or the feature of disposing exhaust flow completely forwardly of the vortex-producing element may be utilized in various vortex generator structures by those skilled in the art without incorporation into a tip jet engine, and are thus usefull for a variety of airfoils besides fixed wing aircraft.

From the foregoing it will be apparent that the present invention presents an improved method of reducing the drag induced by wing tip vortex flow, by providing a jet engine adjacent the tip end for powering the aircraft, exhausting at least a portion of flow from the engine in intercepting relationship with the vortex flow and preferably completely forwardly of the tip end and rotating that jet exhaust flow in opposition to the vortex flow. Most efficient results for both in-flight cruise operation and for landing operation are obtained by exhausting flow from the jet at a spiral angle of between 18 and 36 degrees during cruise, while cyclically varying the spiral angle between approximately 60° co-rotation and 60° counter-rotation relative to the vortex flow during landing and take-off. The embodiments of FIGS. 6–9 maintain a substantially constant restriction to exhaust flow from the engine while the spiral angle is varied in order to prevent excessive back pressure and possible fan stall.

The present invention thus provides method and apparatus for efficiently and economically reducing unwanted wing tip vortex effects. The invention may be incorporated in existing or new aircraft without substantial redesign or costs. Existing turbofan engines, either two spool type illustrated or other forms such as three spool engines wherein all exhaust flow is through an annular-shaped exhaust opening, may be easily and economically modified to incorporate this invention.

While preferred forms of the invention have been set forth in detail, various modifications and alterations will be apparent to those skilled in the art. Accordingly, the foregoing detailed description should be considered exemplary in nature and not as limiting to the scope and spirit of the invention as set forth in the appended claims.

Having described the invention with sufficient clarity that those skilled in the art may make and use it, what is claimed as new and desired to be secured by Letters Patent is:

1. A jet engine adapted to be secured to an aircraft wing adjacent a tip end thereof whereby exhaust flow from said engine intercepts a drag-inducing vortex fluid flow around said tip end from the higher pressure surface to the lower pressure surface of the wings, said engine comprising:
   a housing having fluid inlet and exhaust ducts at opposite ends thereof;
   power means in said housing for producing thrust for powering the aircraft; and
   directing means associated with said exhaust duct for directing at least a portion of said exhaust flow to rotate in opposition to said vortex flow to reduce said vortex induced drag said exhaust duct defining an annular exhaust opening of at least partially annular configuration, said directing means extending radially across said annular exhaust opening to direct exhaust flow therethrough to rotate in opposition to said vortex flow, said exhaust duct further defining a cylindrical exhaust opening at least partially surrounded by said annular exhaust opening whereby said rotating exhaust flow from the latter rotates about exhaust flow from said cylindrical exhaust opening.

2. A jet engine as set forth in claim 1, wherein said power means includes an axial compressor and centrifugal compressor for sequentially compressing fluid in the housing, means for heating said compressed fluid, and first and second turbine means sequentially driven by exhaust flow from said heating means for respectively driving said centrifugal compressor and said axial compressor.

3. A jet engine as set forth in claim 2, wherein said housng includes an outer cowling and an inner casing defining a generally annular bypass fluid flow duct therebetween extending from said inlet duct to said annular exhaust opening, said inner casing having an annular fluid inlet opening whereby first and second portions of fluid flow received through said engine inlet duct respectively pass through said annular exhausting opening and said annular inlet opening, said power means disposed in said inner casing for compressing, heating and exhausting said second portion of fluid flow through said cylindrical exhaust opening.

4. An aircraft comprising:
   a fuselage;
   a lift wing on each side of said fuselage having a tip end allowing an associated drag-inducing vortex fluid flow therearound from the higher pressure surface toward the lower pressure surface of said wing;
   first engine means on said aircraft for producing a major portion of forward thrust for the aircraft;
   second engine means on said aircraft for producing a minor portion of said forward thrust, and including a power thrust tip engine disposed adjacent each of said tip ends producing an exhaust flow intercepting said associated vortex flow; and
   directing means associated with each of said tip engines for directing at least a portion of said exhaust flow therefrom to rotate in opposition to said associated vortex flow to reduce said vortex induced drag, each of said tip engines being a jet engine having fluid inlet and exhaust ducts, said exhaust duct defining an annular exhaust opening of at least partially annular configuration, said directing means extending radially across said annular exhaust opening to direct exhaust flow therefrom, said tip jet engines being secured to said wings whereby said annular exhaust opening are disposed substantially completely forwardly of and in general alignment with the respective wing tip relative to the direction of flight of said aircraft.

5. An aircraft as set forth in claim 4, wherein said exhaust duct further defines a cylindrical exhaust opening at least partially surrounded by said annular exhaust opening whereby said rotating exhaust flow from the latter rotates about exhaust flow from said cylindrical exhaust opening.

6. An aircraft as set forth in claim 4, wherein said directing means includes a plurality of guide vanes disposed in said exhaust duct about said annular exhaust opening and extending radially thereacross.

7. An aircraft as set forth in claim 6, wherein said vanes are inclined in a circumferential direction relative to said annular exhaust opening whereby exhaust flow therethrough tends to rotate in a vortex pattern having a spiral angle determined by the degree of inclination of said vanes.

8. An aircraft as set forth in claim 7, wherein said vanes are pivotally secured to said housing to permit variation of said degree of inclination and said spiral angle.

9. An aircraft as set forth in claim 8, wherein said vanes are cyclically pivotal to cyclically vary said spiral angle in a manner inducing dissipation of said vortex fluid flow.

10. An aircraft as set forth in claim 4, wherein each of said tip engines includes a member secured to said wing at said tip end thereof, said member extending lengthwise along said tip end.

11. An aircraft as set forth in claim 10, wherein said tip engines include an outer housing, said member comprising a cylindrical inner casing extending rearwardly of said annular exhaust opening.

12. An aircraft as set forth in claim 4, further comprising a streamlined support for securing each of said tip engines to the respective wing, said support extending forwardly of said wing and having forward and rearward ends respectively mounted to said tip engine and said wing.

13. In combination with a lift wing of finite length having a tip end allowing a drag-inducing vortex fluid flow therearound from the higher pressure surface toward the lower pressure surface of said wing, said tip end having leading and trailing edges:

a jet engine mounted to said wing at said tip end and having a fluid exhaust duct defining an exhaust opening arranged relative to said wing whereby fluid exhausts from said exhaust opening substantially completely forwardly of said leading edge of said tip end in a rearward direction intercepting said surfaces of the wing at said tip end to intercept said vortex in a manner materially reducing the formation and magnitude of said vortex flow to reduce said drag.

14. In combination with a lift wing of finite length having a tip end allowing a drag-inducing vortex fluid flow therearound from the higher pressure surface toward the lower pressure surface of said wing:

a jet engine mounted to said wing at said tip end and having a fluid exhaust duct defining an exhaust opening arranged relative to said wing whereby fluid exhaust from said exhaust opening substantially completely forwardly of said tip end in a rearward direction intercepting said surfaces of the wing at said tip end to intercept said vortex in a manner materially reducing the formation and magnitude of said vortex flow to reduce said drag, wherein said exhaust opening includes an annular exhaust opening of at least partially annular configuration located forwardly of the leading edge of said tip end a distance at least as great as the maximum diameter of said annular exhaust opening.

15. In combination with a lift wing of finite length having a tip end allowing a drag-inducing vortex fluid flow therearound from the higher pressure surface toward the lower pressure surface of said wing:

a jet engine mounted to said wing at said tip end having a fluid exhaust duct defining an exhaust opening arranged relative to said wing whereby fluid exhaust from said exhaust opening substantially completely forwardly of said tip end in a rearward direction intercepting said surfaces of the wing at said tip end to intercept said vortex in a manner materially reducing the formation and magnitude of said vortex flow to reduce said drag, wherein said exhaust opening includes an annular exhaust opening of at least partially annular configuration located forwardly of the leading edge of said tip end a distance approximately equal to the maximum diameter of said annular exhaust opening.

16. A combination as set forth in claim 15, further including directing means in said exhaust duct for directing fluid exhausting from said annular opening to rotate in opposition to said vortex flow.

17. In combination with a lift wing of finite length having a tip end allowing a drag-inducing vortex fluid flow therearound from the higher pressure surface toward the lower pressure surface of said wing:

a jet engine mounted to said wing at said tip end and having a fluid exhaust duct defining an exhaust opening arranged relative to said wing whereby fluid exhausts from said exhaust opening substantially completely forwardly of said tip end in a rearward direction to intercept said vortex in a manner materially reducing the formation and magnitude of said vortex flow to reduce said drag;

said exhaust opening including an annular exhaust opening of at least partially annular configuration located forwardly of said tip end a distance approximately equal to the maximum diameter of said annular exhaust opening;

directing means in said exhaust duct for directing fluid exhausting from said annular opening to rotate in opposition to said vortex flow; and said directing means extending radially across said annular exhaust and being circumferentially inclined relative thereto whereby exhaust flow rotates in a vortex pattern at a spiral angle determined by said inclination of the directing means.

18. A combination as set forth in claim 17, wherein said spiral angle is between approximately 18 and 36 degrees.

19. A combination as set forth in claim 17, wherein said directing means are pivotally secured to said exhaust duct to permit cyclical variation of said spiral angle in a manner inducing dissipation of said vortex fluid flow.

20. In combination with a lift wing of finite length forwardly movable in a fluid medium and having a tip end allowing drag-inducing vortex fluid flow from the higher pressure surface to the lower pressure surface of said wing about an axis extending along the length of said tip end:

a housing having a fluid duct and an exhaust opening disposed forwardly of said tip end such that exhaust flow therefrom is discharged in a rearward direction generally parallel to said axis to intercept said vortex; and means associated with said exhaust opening for directing said exhaust flow to rotate about said axis coaxially to said vortex flow but in counter-rotating opposition to said vortex flow to materially reduce said drag.

21. A method of reducing drag induced by vortex fluid flow about a tip end of a lift wing of an aircraft having a jet engine disposed adjacent said tip end, comprising the steps of:

operating said engine to produce forward thrust for powering said aircraft;

exhausting fluid flow from said engine in intercepting relationship with said vortex flow;

rotating at least a portion of said exhausting flow in a vortex pattern at a spiral angle in opposition to said vortex flow to materially reduce said drag during normal in-flight operation of the aircraft;

varying said spiral angle to materially dissipate said vortex flow during take-off and landing operation of the aircraft; and maintaining a substantially constant restriction to exhaust flow from said engine while varying said spiral angle.

22. A method of reducing drag induced by vortex fluid flow about a tip end of a lift wing of an aircraft having a jet engine disposed adjacent said tip end, comprising the steps of:

operating said engine to produce forward thrust for powering said aircraft; and exhausting at least a portion of fluid flow from said engine completely forwardly of the span-wise directed neutral axis of said wing at said tip end in a rearward direction intercepting the outer surfaces of said wing at said tip end to thereby intercept and reduce said vortex flow to materially reduce said drag.

23. A method as set forth in claim 22, further including the step of rotating said portion of exhausting fluid flow in opposition to said vortex flow.

24. A method as set forth in claim 23, wherein said rotating step includes rotating said exhausting flow in a vortex pattern at a spiral angle of between approximately 18 and 36 degrees during normal in-flight operation of the aircraft.

25. A jet engine adapted to be secured to an aircraft wing adjacent a tip end thereof whereby exhaust flow from said engine intercepts a drag-induced vortex fluid flow around said tip end from the higher pressure surface to the lower pressure surface of the wing, said engine comprising:
- a housing having fluid inlet and exhaust ducts at opposite ends thereof, said exhaust duct defining an annular exhaust opening of at least partially annular configuration;
- power means in said housing for producing thrust for powering the aircraft; and
- a pluarality of guide vanes extending radially across said annular exhaust opening and inclined in a circumferential direction relative thereto whereby said exhaust flow tends to rotate in a vortex pattern in opposition to said vortex flow to reduce said vortex induced drag, said vortex pattern having a spiral angle determined by the degree of inclination of said vanes, said vanes being pivotally secured to said housing to permit variation of said degree of inclination and said spiral angle, said vanes being cyclically pivotal to cyclically vary said spiral angle in a manner inducing dissipation of said vortex flow.

26. A jet engine as set forth in claim 25, wherein said annular exhaust opening is a complete annular ring adapted to extend around said tip end of the wing.

27. A jet engine adapted to be secured to an aircraft wing adjacent a tip end thereof whereby exhaust flow from said engine intercepts a drag-inducing vortex fluid flow around said tip end from the higher pressure surface to the lower pressure surface of the wing, said engine comprising:
- a housing having fluid inlet and exhaust ducts at opposite ends thereof, said exhaust duct defining an annular exhaust opening of at least partially annular configuration;
- power means in said housing for producing thrust for powering the aircraft;
- a plurality of guide vanes extending radially across said annular exhaust opening and pivotally secured to said housing to permit variable inclination of said vanes in a circumferential direction relative to said annular exhaust opening, whereby said exhaust flow tends to rotate in a vortex pattern in opposition to said vortex flow to reduce said vortex induced drag, said vanes operable to variably restrict said exhaust flow in accordance with variation in said inclination of the vanes;
- movable restricting means for variably restricting said exhaust flow through the exhaust duct; and
- means for actuating said restricting means in correlation with said variation in inclination of the vanes to present a substantially constant restriction to said exhaust flow.

28. A jet engine as set forth in claim 27, wherein said movable restricting means are located downstream of said vanes in series relationship thereto relative to said exhaust flow.

29. A jet engine as set forth in claim 27, wherein said movable restricting means are located in parallel relationship to said vanes relative to said exhaust flow.

30. A jet engine adapted to be secured to an aircraft wing adjacent a tip end thereof whereby exhaust flow from said engine intercepts a drag-inducing vortex fluid flow around said tip end from the higher pressure surface to the lower pressure surface of the wing, said engine comprising:
- a housing having fluid inlet and exhaust ducts at opposite ends thereof, said exhaust duct defining an annular exhaust opening of at least partially annular configuration, said annular exhaust opening including an annular section adapted to extend approximately 180 degrees around said tip end of the wing;
- power means in said housing for producing thrust for powering the aircraft; and
- directing means associated with said exhaust duct for directing at least a portion of said exhaust flow to rotate in opposition to said vortex flow to reduce said vortex induced drag.

31. A jet engine as set forth in claim 30, wherein said exhaust opening includes upper and lower sections connecting with opposite ends of said annular section and respectively configured and adapted to extend generally parallel to said lower and higher pressure surfaces of the wing.

32. In combination with a lift wing of finite length having a tip end allowing a drag-inducing vortex fluid flow therearound from the higher pressure surface toward the lower pressure surface of said wing:
- a jet engine mounted to said wing at said tip end and having a fluid exhaust duct defining an exhaust opening arranged relative to said wing whereby fluid exhausts from said exhaust opening substantially completely forwardly of said tip end in a rearward direction intercepting said surfaces of the wing at said tip end to intercept said vortex in a manner materially reducing the formation and magnitude of said vortex flow to reduce said drag, wherein said exhaust opening includes an annular exhaust opening of at least partially annular configuration located forwardly of the span-wise directed neutral axis of said wing at said tip end thereof.

* * * * *

UNITED STATES PATENT AND TRADEMARK OFFICE
CERTIFICATE OF CORRECTION

PATENT NO. : 3,997,132
DATED : December 14, 1976
INVENTOR(S) : John R. Erwin

It is certified that error appears in the above-identified patent and that said Letters Patent are hereby corrected as shown below:

Col. 1, lines 6, 12 and 17, read "wind" as --wing--.

Col. 1, line 37, before "intercepting" insert --flow--.

Col. 3, line 21, read "crowling" as --cowling--.

Col. 6, line 42, read "vortexproducing" as --vortex-producing--.

Col. 7, line 25, read "wings" as --wing--.

Col. 7, line 34, insert a comma [,] after "drag".

Col. 11, line 16, read "pluarality" as --plurality--.

Signed and Sealed this

Twelfth Day of April 1977

[SEAL]

Attest:

RUTH C. MASON
*Attesting Officer*

C. MARSHALL DANN
*Commissioner of Patents and Trademarks*